US012321024B2

(12) United States Patent
Lai et al.

(10) Patent No.: US 12,321,024 B2
(45) Date of Patent: Jun. 3, 2025

(54) OPTICAL TRANSCEIVER INCLUDING LATCH FOR RELEASE PREVENTION AND OPTICAL COMMUNICATION ASSEMBLY HAVING THE SAME

(71) Applicant: Prime World International Holdings Ltd., New Taipei (TW)

(72) Inventors: Ming-You Lai, New Taipei (TW); Yu Chen, New Taipei (TW); Che-Shou Yeh, New Taipei (TW); Hsuan-Chen Shiu, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 428 days.

(21) Appl. No.: 17/719,770

(22) Filed: Apr. 13, 2022

(65) Prior Publication Data

US 2023/0333338 A1    Oct. 19, 2023

(51) Int. Cl.
*G02B 6/42* (2006.01)
*G08C 23/06* (2006.01)
*H01R 13/627* (2006.01)

(52) U.S. Cl.
CPC ......... *G02B 6/4278* (2013.01); *G02B 6/4246* (2013.01); *G02B 6/4261* (2013.01); *G08C 23/06* (2013.01); *H01R 13/6272* (2013.01)

(58) Field of Classification Search
CPC ... G02B 6/4261; G02B 6/4278; G02B 6/4246
See application file for complete search history.

(56) References Cited

U.S. PATENT DOCUMENTS

| 2010/0098385 | A1* | 4/2010 | Minota | G02B 6/4201 |
| | | | | 385/88 |
| 2014/0235091 | A1* | 8/2014 | Wang | H01R 13/6275 |
| | | | | 439/352 |
| 2015/0263453 | A1* | 9/2015 | Wang | H01R 13/6335 |
| | | | | 385/76 |

\* cited by examiner

*Primary Examiner* — Thomas A Hollweg
*Assistant Examiner* — Kirsten D. Endresen
(74) *Attorney, Agent, or Firm* — Grossman Tucker Perreault & Pfleger, PLLC (57) ABSTRACT

An optical transceiver includes a housing, a fastening component and a latch. The fastening component is disposed on the housing. The fastening component is movable with respect to the housing in a releasing direction from an electrical port of the optical transceiver toward a fiber optic port of the optical transceiver. The latch is movably disposed on the housing to be at either an unlocking position or a locking position. The fastening component is allowed to be moved with respect to the housing in the releasing direction when the latch is at the unlocking position, and a movement of the fastening component in the releasing direction is confined by the latch when the latch is at the locking position.

17 Claims, 8 Drawing Sheets

OPTICAL TRANSCEIVER INCLUDING LATCH FOR RELEASE PREVENTION AND OPTICAL COMMUNICATION ASSEMBLY HAVING THE SAME

BACKGROUND

1. Technical Field

The present disclosure relates to optical communication, more particularly to an optical communication assembly including a cage and an optical transceiver.

2. Related Art

Optical modules, such as optical transceivers, are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others such as QSFP-DD (double density) and QSFP-28 at different communication rates have been made available.

A fastening mechanism is provided for securely fixing the optical transceiver to the cage. On the other hand, the optical transceiver must include a releasing mechanism so that the optical transceiver could be released from the cage smoothly when necessary.

SUMMARY

According to one aspect of the present disclosure, an optical transceiver, configured to be inserted into a cage in pluggable manner, includes a housing, a fastening component and a latch. The fastening component is disposed on the housing and detachably fastenable with the cage. The fastening component is movable with respect to the housing in a releasing direction from an electrical port of the optical transceiver toward a fiber optic port of the optical transceiver. The latch is movably disposed on the housing to be at either an unlocking position or a locking position. The fastening component is allowed to be moved with respect to the housing in the releasing direction when the latch is at the unlocking position, and a movement of the fastening component in the releasing direction is confined by the latch when the latch is at the locking position.

According to another aspect of the present disclosure, an optical transceiver includes an optical transceiver, configured to be inserted into a cage in pluggable manner, includes a housing, a fastening component, a latch and a pull tab. The fastening component is disposed on the housing and movable with respect to the housing in a releasing direction from an electrical port of the optical transceiver toward a fiber optic port of the optical transceiver. The fastening component includes a fastening arm and a confining portion connected with each other. The fastening arm extends in the releasing direction and is detachably fastenable with the cage, and the confining portion extends in a direction non-parallel to the releasing direction. The latch is pivotally disposed on the housing to be at either an unlocking position or a locking position, and the pull tab is fixed to the fastening component. When the latch is at the unlocking position, the fastening component is allowed to be moved with respect to the housing in the releasing direction. When the latch is at the locking position, at least part of the latch is located between the pull tab and the fiber optic port of the optical transceiver, and a movement of the fastening component in the releasing direction is confined by interference between the latch and the confining portion.

According to yet another aspect of the present disclosure, an optical communication assembly includes a cage, and an optical transceiver inserted into the cage. The optical transceiver includes a housing, a fastening component and a latch. The fastening component is disposed on the housing and detachably fastened with the cage. The fastening component is movable with respect to the housing in a releasing direction from an electrical port of the optical transceiver toward a fiber optic port of the optical transceiver. The latch is movably disposed on the housing to be at either an unlocking position or a locking position. When the latch is at the unlocking position, the fastening component is allowed to be pulled in the releasing direction to be detached from the cage. When the latch is at the locking position, a movement of the fastening component in the releasing direction is confined by the lock, and the fastening component maintains fastened with the cage.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
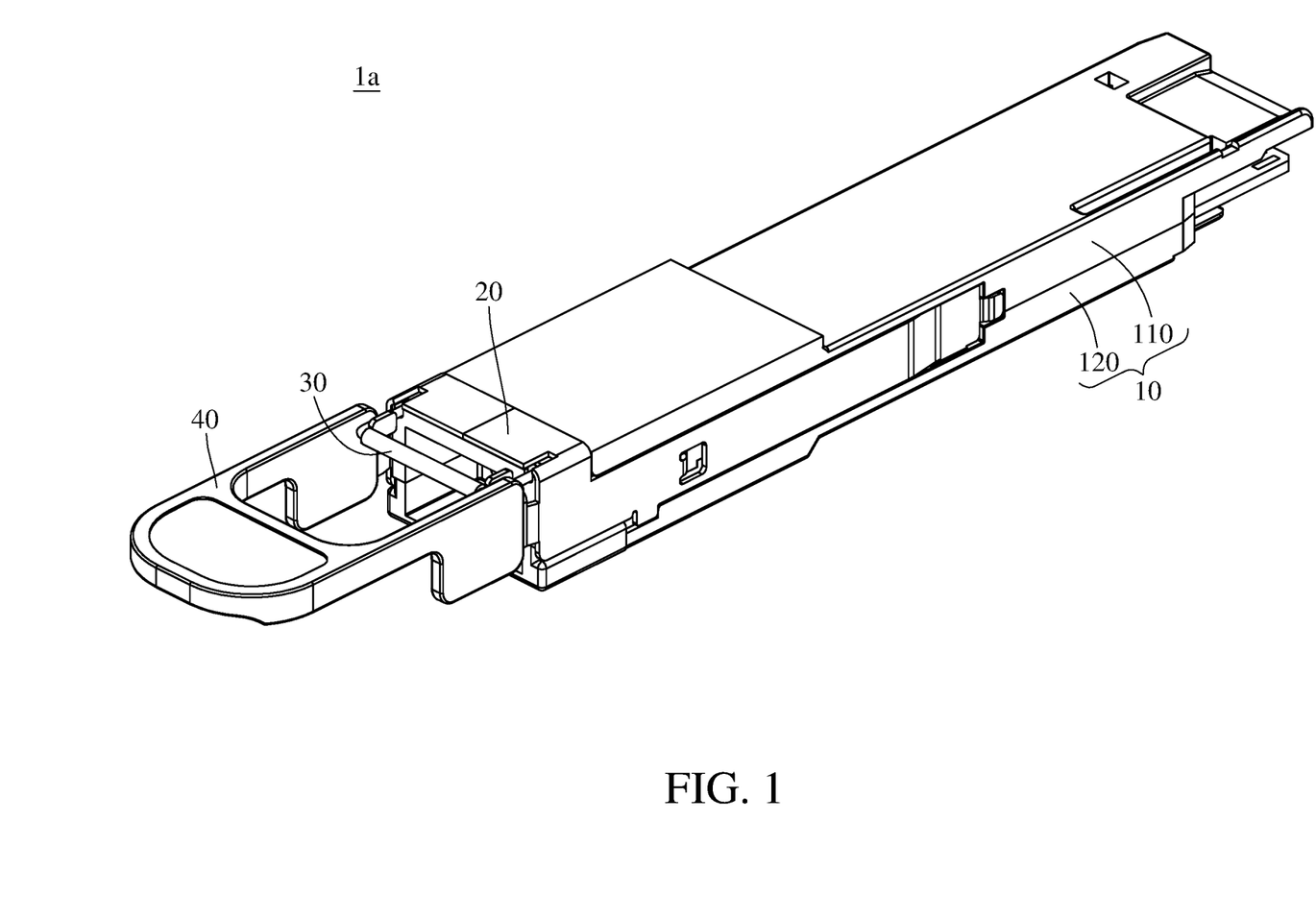
FIG. 1 is a perspective view of an optical transceiver according to one embodiment of the present disclosure.
Figure 2:
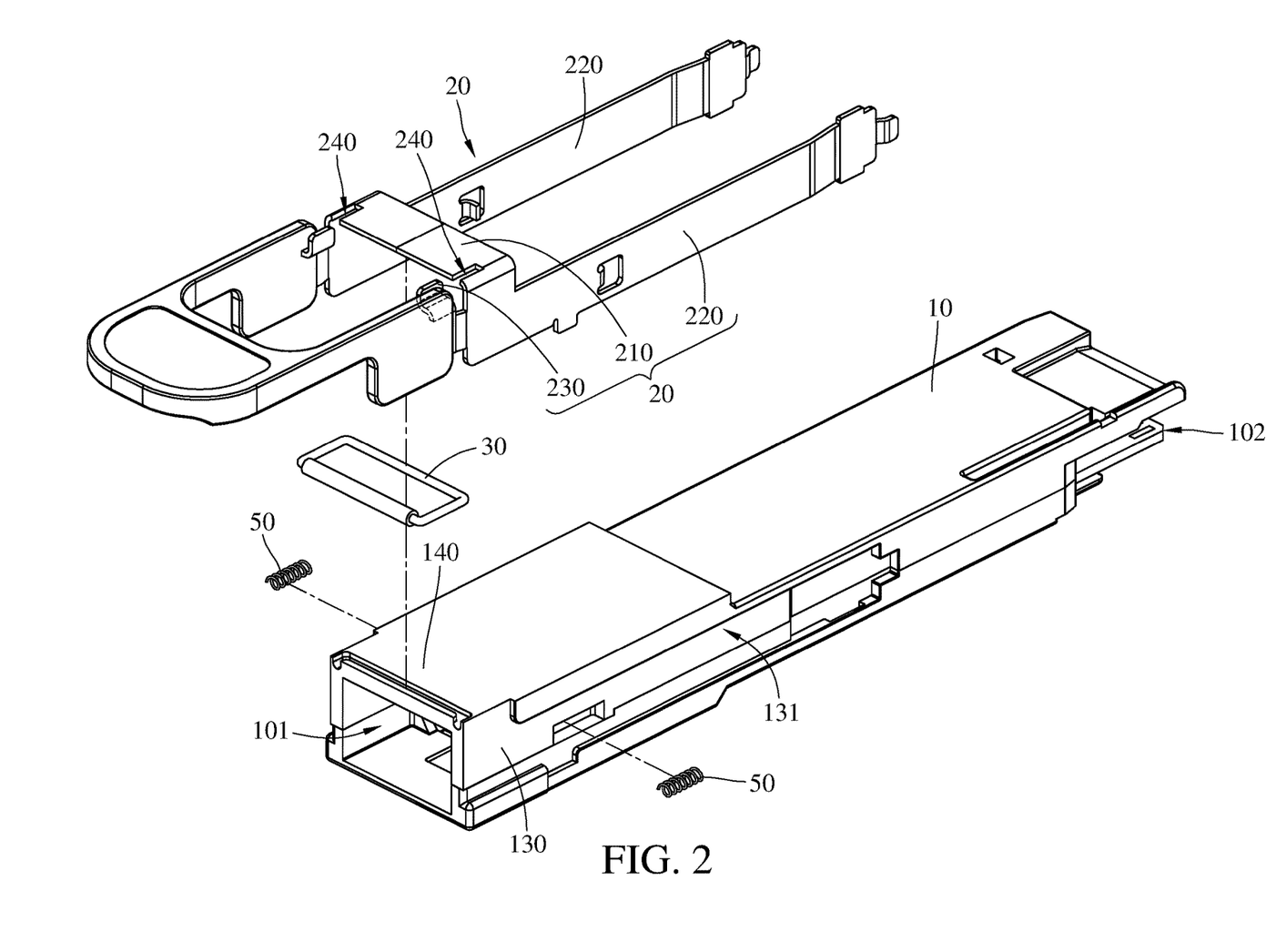
FIG. 2 is an exploded view of the optical transceiver in FIG. 1.
Figure 3:
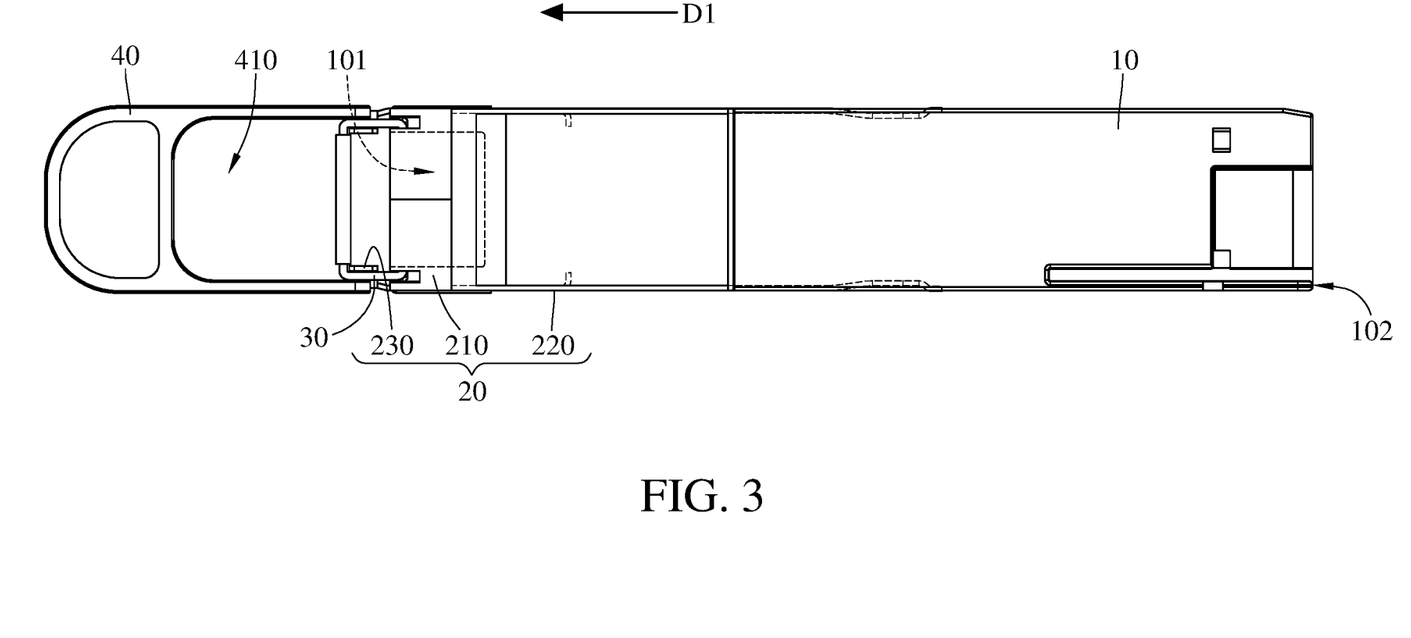
FIG. 3 is a top view of the optical transceiver in FIG. 1.

Please refer to FIG. 1 through FIG. 3. FIG. 1 is a perspective view of an optical transceiver according to one embodiment of the present disclosure, FIG. 2 is an exploded view of the optical transceiver in FIG. 1, and FIG. 3 is a top view of the optical transceiver in FIG. 1. In this embodiment, an optical transceiver 1a may include a housing 10, a fastening component 20, a latch 30 and a pull tab 40. One or more optical communication elements, such as transmitter optical sub-assembly (TOSA) and/or receiver optical sub-assembly (ROSA), may be provided in the housing 10.

The housing 10 may include an upper casing 110 and a lower casing 120 which are assembled together. The housing 10 may be configured to be accommodated in a cage (not shown in FIG. 1 through FIG. 3) for optical communication, and details will be described hereafter. It is worth noting that the housing 10 including two assembled parts (upper casing 110 and lower casing 120) are not limited in view of embodiments in the present disclosure. In some embodiments, the housing of the optical transceiver may be a single unit.

Referring to the housing 10 as a whole, the housing 10 may include a lateral surface 130, and a recessed groove 131 may be formed on the lateral surface 130. The recessed groove 131 may extend along a direction from a fiber optic port 101 of the optical transceiver 1a toward an electrical port 102 of the optical transceiver 1a. The fiber optic port 101 may include connectors or receptacles for transmitting optical signals, and the electrical port 102 may include wires or contact pads for transmitting electrical signals.

The fastening component 20 may include a linkage arm 210 and a fastening arm 220 connected with each other. The linkage arm 210 may be disposed on a top surface 140 of the housing 10, and the fastening arm 220 may be movably disposed in the recessed groove 131 formed on the lateral surface 130. Specifically, the fastening component 20 is movable with respect to the housing 10 in a releasing direction D1 from the electrical port 102 toward the fiber optic port 101, and the fastening component 20 may further include a confining portion 230 connected with each other. The fastening arm 221 may extend in the releasing direction D1, and the confining portion 230 may extend in a direction D2 non-parallel to the releasing direction D1. FIG. 2 exemplarily depicts a pair of fastening components 20 with the fastening arms 220 of respective fastening components 20 at opposite sides of the housing 10.

The latch 30 may be disposed on the housing 10 and rotatable with respect to the housing 10 to be at either an unlocking position or a locking position. Specifically, the latch 30 may be pivotally disposed on the top surface 140 of the housing 10. The latch 30 may be configured to confine the movement of the fastening component 20 in the releasing direction D1, and any details will be described hereafter.

The pull tab 40 may be fixed to the fastening component 20. Specifically, the pull tab 40 may be a resilient handle made of non-metallic material, such as plastic and rubber. Human operators can move the fastening component 20 in the releasing direction D1 by putting finger into a pocket opening 410 of the pull tab 40 in order to pull the pull tab 40.

The optical transceiver 1a may further include one or more elastic elements 50 accommodated in the housing 10. The fastening component 20 can be moved in the releasing direction D1 to push the elastic element 50. The elastic element 50 after being compressed by the fastening component 20 may help to move the fastening component 20 back to its normal position.

Figure 4:
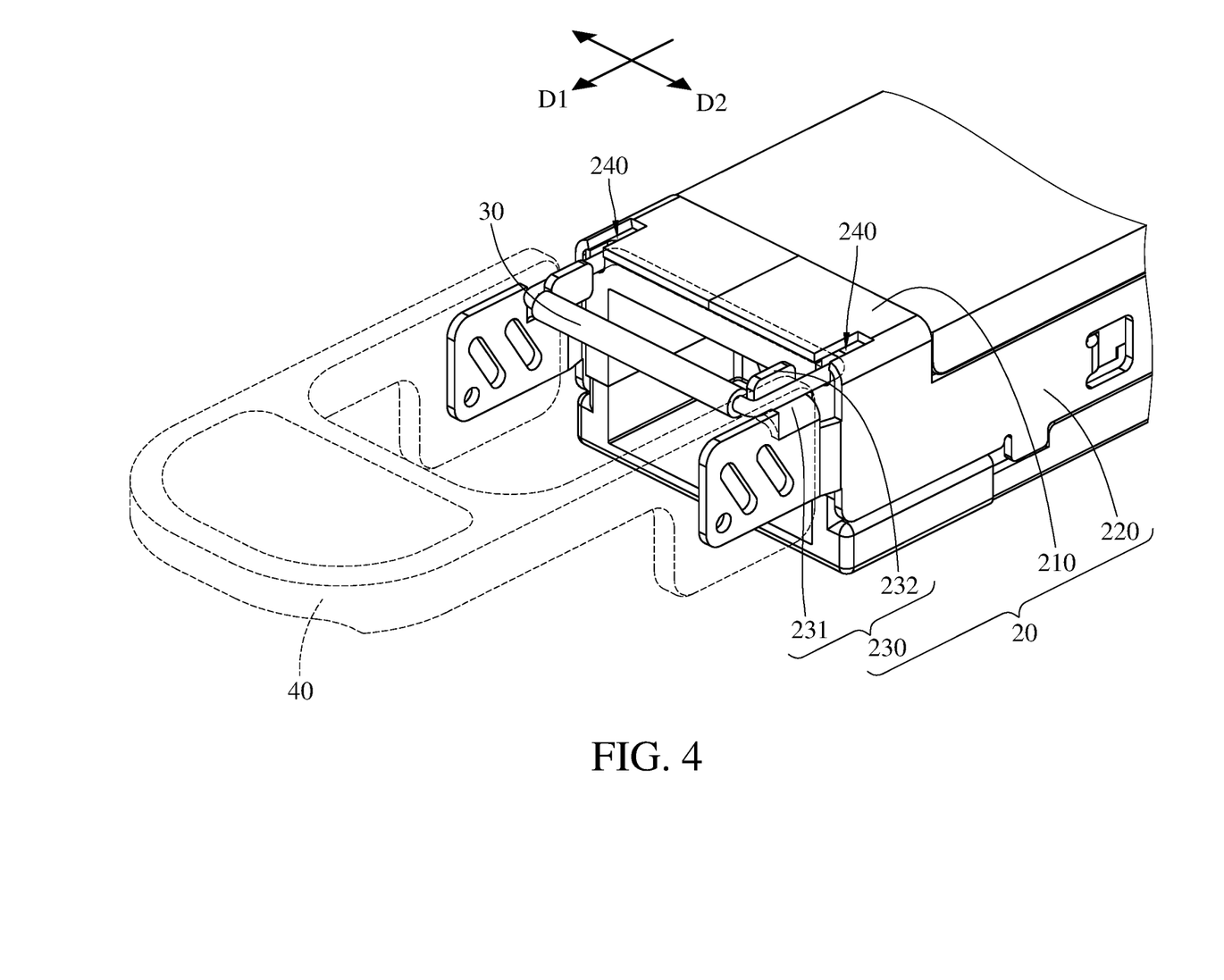
FIG. 4 is a partially enlarged view of the optical transceiver in FIG. 1.
Figure 5:
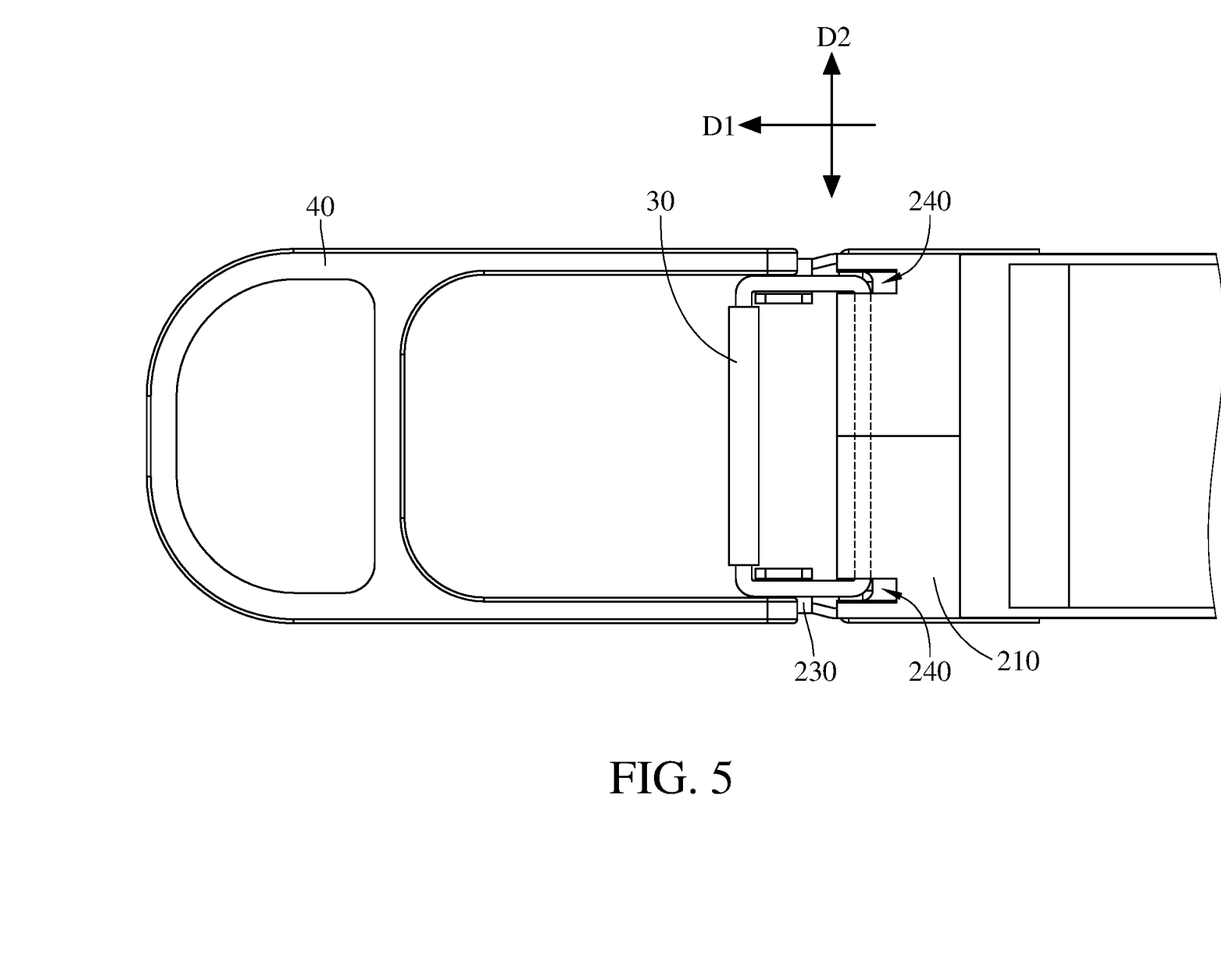
FIG. 5 is a partially enlarged view of the optical transceiver in FIG. 3.

Please refer to FIG. 4 and FIG. 5. FIG. 4 is a partially enlarged view of the optical transceiver in FIG. 1, and FIG. 5 is a partially enlarged view of the optical transceiver in FIG. 3. The confining portion 230 of the fastening component 20 may include a supporting section 231 and a confining section 232 connected with each other. The supporting section 231 may be connected with the fastening arm 220 and located between the fastening arm 220 and the confining section 232. The supporting section may extend in the direction D2, which may be non-parallel to the releasing direction D1, and the confining section 232 may be substantially perpendicular to the supporting section 231. The supporting section 231 may serve as a carrier for supporting the latch 30, and the confining section 232 may serve as a protrusion for interfering with the latch 30.

Also, the fastening component 20 may include an open slot 240 formed at an edge of the fastening component 20 and extending in the releasing direction D1. Specifically, as shown in FIG. 4 and FIG. 5, the open slot 240 may be formed on the linkage arm 210 of the fastening component 20. The open slot 240 may be configured to accommodate the latch 30.

Figure 6:
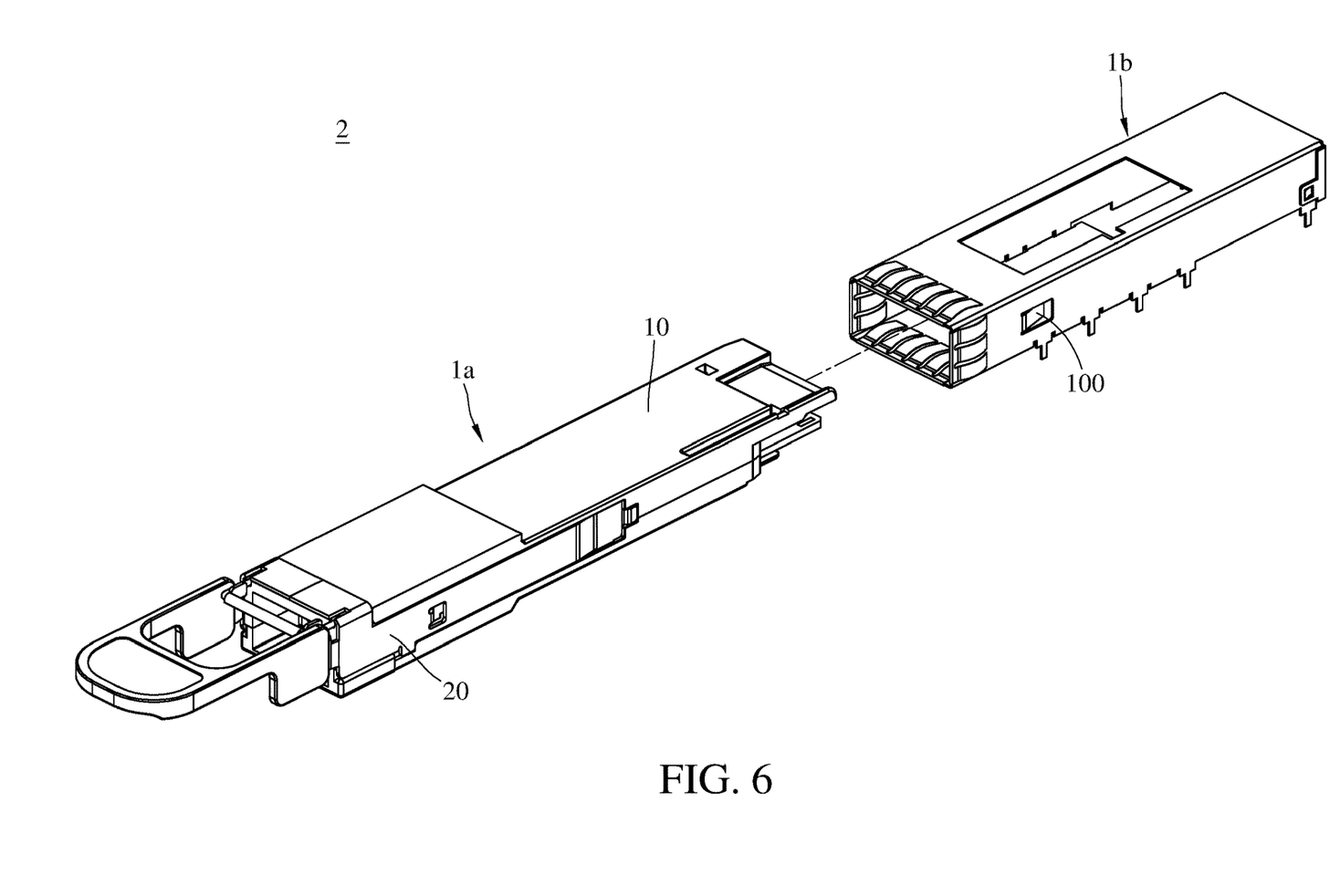
FIG. 6 is an exploded view of an optical communication assembly including the optical transceiver in FIG. 1, according to one embodiment of the present disclosure.

FIG. 6 is an exploded view of an optical communication assembly including the optical transceiver in FIG. 1, according to one embodiment of the present disclosure. In this embodiment, an optical communication assembly 2 may include a cage 1b and the aforementioned optical transceiver 1a. The optical transceiver 1a can be inserted into the cage 1b in a pluggable manner. The fastening component 20 can be detachably fastened with the cage 1b with the fastening arm 220 hooking with a slot 100 formed on the cage 1b.

Figure 7:
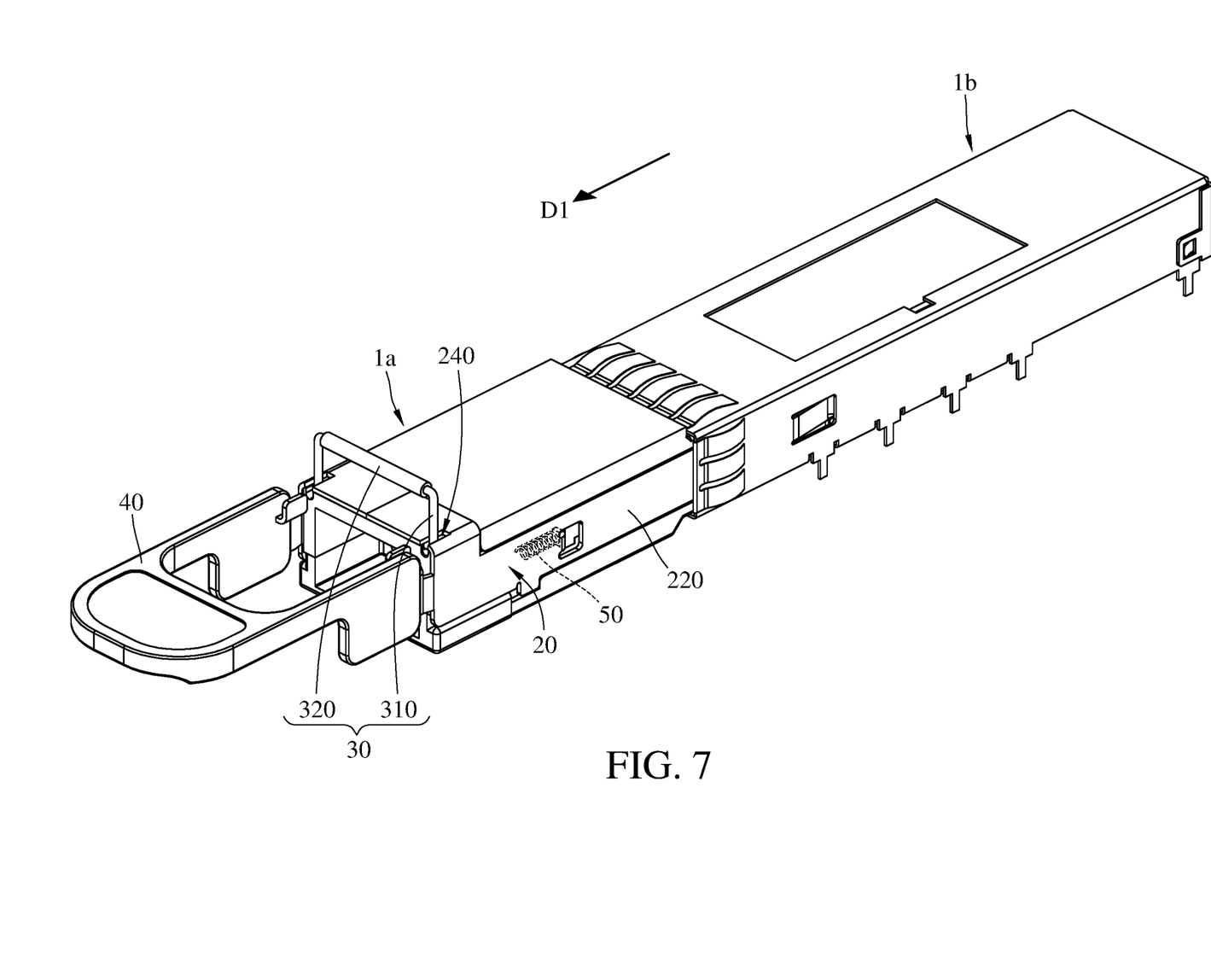
FIG. 7 is a schematic view of the optical system in FIG. 6, with a latch of the optical transceiver at an unlocking position.

The fastening component 20 is allowed to be moved with respect to the housing 10 in the releasing direction D1 when the latch 30 is at the unlocking position. FIG. 7 is a schematic view of the optical system in FIG. 6, with a latch of the optical transceiver at the unlocking position. The latch 30 at the unlocking position is relatively upright. A shaft part 310 of the latch 30 is accommodated in the open slot 240, and a blocking part 320 of the latch 30 is located above the housing 10 or the pocket opening of the pull tab 40. The latch 30 at the unlocking position cannot interfere with the fastening component 20, such that the fastening component 20 is free to be moved in the releasing direction D1 to be detached from the cage 1b, and is free to be moved reversely to be fastened with the cage 1b.

Figure 8:
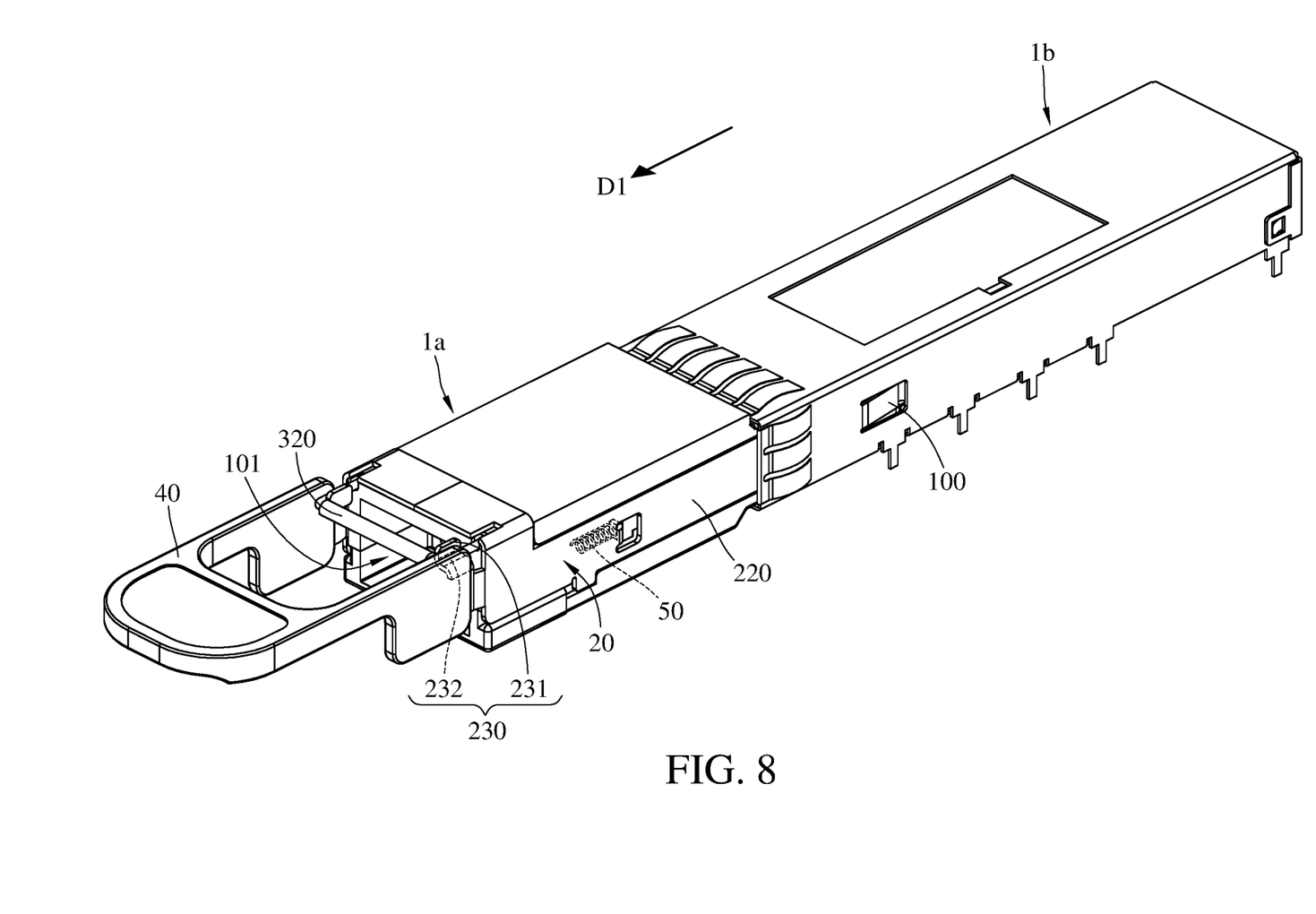
FIG. 8 is a schematic view of the optical system in FIG. 6, with the latch of the optical transceiver at a locking position.

The movement of the fastening component 20 in the releasing direction D1 is confined by the latch 30 when the latch 30 is at the locking position. FIG. 8 is a schematic view of the optical system in FIG. 6, with the latch of the optical transceiver at the locking position. At the locking position, the latch 30 is supported on the supporting section 231 of the confining portion 230 of the fastening component 20, and the blocking part 320 of the latch 30 is located between the pull tab 40 and the fiber optic port 101 of the optical transceiver 1a. The movement of the fastening component 20 is confined by an interference between the latch 30 and the confining portion 230. More specifically, since the blocking part 320 of the latch 30 obstructs a path where the confining section 232 of the confining portion 230 passes when the fastening component 20 is pulled, the fastening component 20 cannot be detached from the cage 1b, thereby preventing accidental release of the optical transceiver 1a. Also, when the fastening component 20 is slightly pulled in the releasing direction D1, the fastening component 20 may still compress the elastic element 50, and such small movement of the fastening component 20 may not be sufficient enough to completely unhook the fastening component 20 from the slot 100, so that the fastening component 20 could only be back to its normal position where the fastening arm 220 is stably hooked with the slot 100 by the elastic element 50. In other words, the fastening component 20 may maintain being fastened with the cage 1b.

As to a conventional optical transceiver inserted into the corresponding cage, the optical transceiver may be accidentally released from the cage. Especially, in a condition that the pull tab of the optical transceiver is a non-rotatable rubber handle or plastic handle for the purpose of low manufacturing cost, the pull tab may constantly stick out, and he human operator may unintentionally cause the pull tab to thereby detach the fastening component from the cage. When the fastening component is accidentally moved to cause the optical transceiver to be released from the cage, it is expected that the fastening component can be moved back by the elastic element so as to re-hook with the cage. However, some elements or structures presented nearby the optical transceiver may result in the friction that could compromise the re-hooking between the fastening component and the cage.

According to the present disclosure, the optical transceiver includes a latch movably disposed on the housing. The fastening component is allowed to be moved with respect to the housing in the releasing direction when the latch is at the unlocking position, and the movement of the fastening component in the releasing direction is confined by the latch when the latch is at the locking position. The latch at the unlocking position cannot interfere with the fastening component, such that the fastening component is free to be moved in the releasing direction to be fastened with the cage, and is free to be moved reversely to be detached from the cage. The latch at the locking position obstructs a path where the fastening component passes, such that the fastening component cannot detached from the cage, thereby preventing an accidental release of the optical transceiver.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, configured to be inserted into a cage in a pluggable manner, comprising:
    a housing;
    a fastening component disposed on the housing and detachably fastenable with the cage, wherein the fastening component is movable with respect to the housing in a releasing direction from an electrical port of the optical transceiver toward a fiber optic port of the optical transceiver, the fastening component comprises a fastening arm and a confining portion connected with each other; and
    a latch movably disposed on the housing to be at either an unlocking position or a locking position, wherein the latch is movable between the unlocking position and the locking position without movement of the fastening component with respect to the housing in the releasing direction;
    wherein when the latch is at the unlocking position, a detachment of the fastening component from the cage by a movement of the fastening component is allowed, and
    when the latch is at the locking position, at least part of the confining portion is located between the latch and the fiber optic port in the releasing direction and the detachment of the fastening component from the cage is confined by interference between the latch and the confining portion of the fastening component.

2. The optical transceiver according to claim 1, wherein the fastening arm extends in the releasing direction and is detachably fastenable with the cage, and the confining portion extends in a direction non-parallel to the releasing direction.

3. The optical transceiver according to claim 2, wherein the confining portion comprises a confining section and a supporting section connected with each other, the supporting section is connected with the fastening arm and extends in the direction non-parallel to the releasing direction, and the confining section is perpendicular to the supporting section;
    wherein when the latch is at the locking position, at least part of the latch is supported on the supporting section, and the movement of the fastening component is confined by interference between the latch and the confining section.

4. The optical transceiver according to claim 1, wherein the latch is pivotally disposed on the housing, and the latch is rotatable with respect to the housing to be at either the unlocking position or the locking position.

5. The optical transceiver according to claim 4, wherein the fastening component comprises an open slot formed at an edge of the fastening component and extending in the releasing direction, and at least part of the latch at the unlocking position is accommodated in the open slot.

6. The optical transceiver according to claim 1, further comprising a pull tab fixed to the fastening component.

7. The optical transceiver according to claim 6, wherein at least part of the latch at the locking position is located between the pull tab and the fiber optic port of the optical transceiver.

8. The optical transceiver according to claim 6, wherein the pull tab is a resilient handle made of non-metallic material.

9. An optical transceiver, configured to be inserted into a cage in pluggable manner, comprising:
    a housing;
    a fastening component disposed on the housing, wherein the fastening component is movable with respect to the housing in a releasing direction from an electrical port of the optical transceiver toward a fiber optic port of the optical transceiver, the fastening component comprises a fastening arm and a confining portion connected with each other, the fastening arm extends in the releasing direction and is detachably fastenable with the cage, and the confining portion extends in a direction non-parallel to the releasing direction;
    a latch pivotally disposed on the housing to be at either an unlocking position or a locking position, wherein the latch is pivotable between the unlocking position and the locking position without movement of the fastening component with respect to the housing in the releasing direction; and
    a pull tab fixed to the fastening component;
    wherein when the latch is at the unlocking position, a detachment of the fastening component from the cage by a movement of the fastening component is allowed, and
    when the latch is at the locking position, at least part of the latch is located between the pull tab and the fiber optic port of the optical transceiver and at least part of the confinement portion is located between the latch and the fiber optic port in the releasing direction, and the detachment of the fastening component from the cage is prohibited by interference between the latch and the confining portion.

10. The optical transceiver according to claim 9, wherein the confining portion comprises a confining section and a supporting section connected with each other, the supporting section is connected with the fastening arm and extends in the direction non-parallel to the releasing direction, and the confining section is perpendicular to the supporting section;

wherein when the latch is at the locking position, the at least part of the latch is supported on the supporting section, and the movement of the fastening component is confined by interference between the latch and the confining section.

11. The optical transceiver according to claim 9, wherein the pull tab is a resilient handle made of non-metallic material.

12. An optical communication assembly, comprising:

a cage; and an optical transceiver inserted into the cage, and the optical transceiver comprising:

a housing;

a fastening component disposed on the housing and detachably fastened with the cage, wherein the fastening component is movable with respect to the housing in a releasing direction from an electrical port of the optical transceiver toward a fiber optic port of the optical transceiver, the fastening component comprises a fastening arm and a confining portion connected with each other;

a latch movably disposed on the housing to be at either an unlocking position or a locking position, wherein the latch is movable between the unlocking position and the locking position without movement of the fastening component with respect to the housing in the releasing direction; and wherein when the latch is at the unlocking position, a detachment of the fastening component from the cage by a movement of the fastening component is allowed, and when the latch is at the locking position, at least part of the confining portion is located between the latch and the fiber optic port in the releasing direction, and the detachment of the fastening component from the cage is prohibited by interference between the latch and the confining portion of the fastening component.

13. The optical communication assembly according to claim 12, wherein the fastening arm extends in the releasing direction and is detachably fastened with the cage, and the confining portion extends in a direction non-parallel to the releasing direction.

14. The optical transceiver according to claim 13, wherein the confining portion comprises a confining section and a supporting section connected with each other, the supporting section is connected with the fastening arm and extends in the direction non-parallel to the releasing direction, and the confining section is perpendicular to the supporting section;

wherein when the latch is at the locking position, at least part of the latch is supported on the supporting section, and the movement of the fastening component is confined by interference between the latch and the confining section.

15. The optical communication assembly according to claim 12, further comprising a pull tab fixed to the fastening component.

16. The optical communication assembly according to claim 15, wherein at least part of the latch at the locking position is located between the pull tab and the fiber optic port of the optical transceiver.

17. The optical communication assembly according to claim 15, wherein the pull tab is a resilient handle made of non-metallic material.

\* \* \* \* \*